Patented Apr. 25, 1950

2,505,244

UNITED STATES PATENT OFFICE 2,505,244

ASYMMETRIC AZO DYESTUFFS OF THE PYRAZOLONE SERIES AND A PROCESS OF MAKING SAME

Peter Hindermann, Basel, Switzerland, assignor to J. R. Geigy A. G., Basel, Switzerland No Drawing. Application December 31, 1946, Serial No. 719,634. In Switzerland December 27, 1945

6 Claims. (Cl. 260—160)

I have found that the metallizable asymmetric azo dyestuffs of the pyrazolone series of the general Formula I

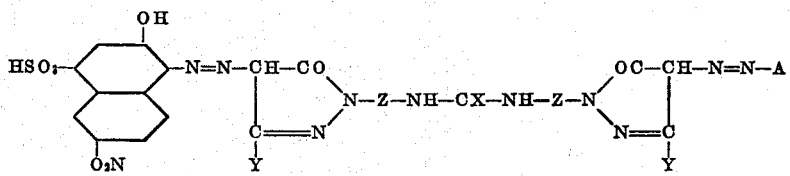

wherein

X represents an oxygen or sulfur atom,
Y denotes a methyl, ethyl or phenyl group,
Z denotes a member selected from the group consisting of radicals of the benzene series bound in 1:4-position and of radicals of the diphenyl series bound in 4:4'-position and
A denotes a radical of an aromatic amine different from the radical of 1-diazo-6-nitro-2-hydroxynaphthalene-4-sulfonic acid, possess very valuable properties. The new dyestuffs can be prepared according to different methods. Thus, for instance molar quantities of 1 - diazo - 6 - nitro - 2 - hydroxynaphthalene - 4 - sulfonic acid and of a different, suitable, diazotized aromatic amine which may still further be substituted can be combined in the manner known for the preparation of pyrazolone dyestuffs in any order of succession with molar quantities of a dipyrazolone of the following general Formula II in a slightly acid, neutral or slightly alkaline medium

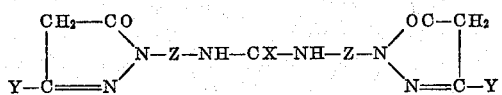

wherein X, Y and Z have the above significance. Another method consists in linking mixtures of amino azo dyestuffs obtainable, on the one hand, from 1-diazo-6-nitro-2-hydroxynaphthalene-4-sulfonic acid, on the other hand from any diazotized aromatic amine different from the former compound and being further substituted, if desired, as well as of an amino aryl pyrazolone of the general Formula III

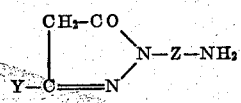

wherein Y and Z correspond to the above significance, with phosgene, thiophosgene or carbon disulfide.

As aromatic amines falling within the scope of the radical A in the above Formula I may be enumerated unsubstituted or substituted primary aromatic amines; among the latter ones I use preferably those which carry metallizable groups or substituents convertible into such metallizable groups in o-position to the diazotizable amino group. In all of the aromatic amines the alkyl, halogen, hydroxyl, alkoxy, nitro, acylamino, carboxy, carbamino, sulfonic acid groups and so on may be present.

The new method according to the present invention makes possible the production of a large number of new dyestuffs which are distinguished by good to very good affinity for cellulosic fibres.

The asymmetric disazo dyestuffs built up from 1 - (4' - amino - phenyl) - 3 - methyl - 5 - pyrazolone - urea are particularly valuable, as the same are easily available and possess a good affinity. The asymmetric disazo dyestuffs of the general Formula I, wherein A denotes the radical of a simple diazotizable amino compound of the naphthalene series, the radical of an o-hydroxy, o-alkoxy or o-carboxy amino compound of the benzene series which is free from sulfonic acid groups or the radical of a diazotized 4'-acylamino-4-amino compound of the diphenyl series, possess excellent fastness properties in the moist state, if the dyeings on cellulosic fibres have been aftertreated with copper salts. By a treatment with metal-yielding agents the new disazo dyestuffs can be converted according to known methods into the metal complex compounds. Because of their excellent light-fastness the complex copper compounds are particularly valuable. The coppering can be carried out, as known, for instance with copper sulfate in a neutral or slightly acetic acid bath or in the presence of tartaric salts in a slightly alkaline bath. The dyestuffs can also be converted in substance according to known methods in an acid, neutral or alkaline medium by means of the usual copper compounds into complex copper compounds. When treating the dyestuffs of the present invention with copper salts often the fastness properties to alkalis and in the moist state, beside the light-fastness, will be improved. The new dyestuffs dye cellulosic fibres in different shades varying in general from orange, red to red-brown, this depending upon the constitution of the dyestuffs.

The following examples will illustrate how to carry out the new method, without limiting the present invention to the said examples, in which the parts are by weight. Moreover, it may be understood that parts by weight bear the same relationship to parts by volume that grams bear to cubic centimeters. The temperatures are expressed in degrees centigrade.

*Example 1*

29.5 parts of 1-diazo-6-nitro-2-hydroxynaphthalene-4-sulfonic acid are combined, while cooling with ice, in the presence of an excess of sodium carbonate with 40.4 parts of urea of 1-(4'-aminophenyl)-3-methyl-5-pyrazolone in order to produce the intermediate product. After some hours the formation of the intermediate product is complete. The sodium carbonate present in an excess is treated with hydrochloric acid, until a bicarbonatic reaction has been reached, whereupon further coupling is effected with the diazonium compound of 13.7 parts of 5-methyl-2-methoxy-1-amino-benzene. The disazo dyestuff thus formed is precipitated with sodium chloride, filtered and dried. It constitutes a dark powder which is soluble in water with a dark red-brown coloration and in concentrated sulfuric acid with an orange coloration. The new dyestuff dyes cellulosic fibres from a neutral bath containing Glauber's salt in reddish brown shades which are changed by an after-treatment with copper sulfate into a red coloration distinguished by very good fastness properties to light and in the moist state.

The urea of 1-(4'-aminophenyl)-3-methyl-5-pyrazolone can be obtained by introducing phosgene into a solution of 37.8 parts of the said aminopyrazolone in 500 parts of water in the presence of an excess of sodium carbonate at room temperature, until no free amino groups can be detected.

*Example 2*

29.5 parts of 1-diazo-6-nitro-2-hydroxynaphthalene-4-sulfonic acid are combined with 40.4 parts of urea of 1-(4'-aminophenyl)-3-methyl-5-pyrazolone in the manner described in Example 1, thus giving the monoazo intermediate product. The latter is then coupled in a litmus-neutral medium with the diazo compound from 13.7 parts of 2-amino benzoic acid to give the disazo dyestuff, which is isolated by addition of sodium chloride. The new dyestuff is a dark powder, dissolving in water with a dark red-brown coloration and in concentrated sulfuric acid with an orange coloration and dyeing cellulosic fibres in reddish-brown shades. By an after-treatment with copper sulfate an orange red shade is produced which is distinguished by very good fastness properties in the moist state and to light.

A dyestuff of similar properties will be obtained, if 17.15 parts of 5-chloro-2-aminobenzoic acid, instead of 2-aminobenzoic acid, are diazotized in the manner described in the above example and worked up otherwise in exactly the same manner.

*Example 3*

56 parts of aminoazo dyestuff obtainable by coupling diazotized 1-amino-6-nitro-2-hydroxynaphthalene-4-sulfonic acid with 1-phenyl-(4'-phenyl-4''-amino)-3-methyl-5-pyrazolone and 57.9 parts of the amino azo dyestuff obtainable by coupling diazotized 1-aminonaphthalene-3:6-disulfonic acid with 1-phenyl-(4'-phenyl-4''-amino)-3-methyl-5-pyrazolone are condensed in 1000 parts of water in the presence of an excess of sodium carbonate at ordinary temperature with phosgene, until no more free amino groups can be detected. The so-formed asymmetric disazo dyestuff is salted out, filtered by suction, and dried. It constitutes a dark powder dissolving in water with a red coloration and in concentrated sulfuric acid with an orange coloration, the new dyestuff dyeing cotton and fibres from regenerated cellulose in red-brown shades which are converted into orange shades of good fastness properties in the moist state and to light, when after-treated with copper salts.

The same dyestuff will be obtained, if 29.5 parts of 1-diazo-6-nitro-2-hydroxy-naphthalene-4-sulfonic acid are combined with 55.6 parts of urea of 1 - phenyl - (4' - phenyl-4''-amino) -3-methyl-5-pyrazolone to give the intermediate product and if the latter is further coupled with the diazo compound obtainable from 30.3 parts of 1-aminonapthalene-3:6-disulfonic acid.

The urea of 1-phenyl-(4'-phenyl-4''-amino)-3-methyl-5-pyrazolone is obtained by introducing phosgene into a solution of 53 parts of the said aminopyrazolone in 500 parts of water in the presence of an excess of sodium carbonate at room temperature, until no more free amino groups can be detected.

*Example 4*

29.5 parts of 1 - diazo-6 - nitro - 2 - hydroxynaphthalene-4-sulfonic acid are combined as indicated in Example 1 with 40.4 parts of urea of 1-(4'-aminophenyl)-3-methyl-5-pyrazolone, thus giving the intermediate product. The resulting monoazo dyestuff is coupled in a medium neutral to litmus with the diazonium compound from 14.3 parts of 2-aminonaphthalene in order to produce the disazo dyestuff, which is isolated by means of sodium chloride. The new dyestuff constitutes a dark powder dissolving in water with a red-brown coloration and in concentrated sulfuric acid with an orange coloration; it dyes cellulosic fibres in reddish-brown shades. By an after-treatment with copper salts a red coloration is obtained, whose dyeings possess a very good light fastness and very good fastness properties in the moist state.

A dyestuff of similar properties will be obtained, if in the above example, instead of 2-aminonaphthalene, 14.3 parts of 1-aminonaphthalene are diazotized and worked up in exactly the same manner.

*Example 5*

29.5 parts of 1-diazo-6-nitro-2-hydroxynaphthalene-4-sulfonic acid are combined according to Example 1 with 40.4 parts of urea of 1-(4'-aminophenyl)-3-methyl-5-pyrazolone, thus giving the monoazo dyestuff, which is then further coupled in a litmus-neutral medium to the disazo dyestuff by means of the diazonium compound from 18.7 parts of 2-aminonaphthalene-3-carboxylic acid. The disazo dyestuff is isolated by addition of sodium chloride, then filtered by suction and dried. The so-obtained disazo dyestuff which is a dark powder is soluble in water with a brownish-red coloration and in concentrated sulfuric acid with an orange coloration and dyes fibres from regenerated cellulose in reddish-brown shades. By an after-treatment with copper sulfate these shades are converted into red shades of good fastness properties to light and in the moist state.

*Example 6*

29.5 parts of 1-diazo-6-nitro-2-hydroxynaphthalene-4-sulfonic acid are combined with 42 parts of thiourea of 1 - (4' - aminophenyl) -3-methyl-5-pyrazolone in the presence of an excess of sodium carbonate, thus giving the monoazo dyestuff. After stirring for several hours while cooling with ice the diazo compound has disappeared. Then the excess of sodium carbonate is treated with hydrochloric acid, until the bicarbonatic stage has been reached, whereupon the mixture is further coupled with the diazonium compound from 9.3 parts of 1-aminobenzene. The resultant disazo dyestuff is isolated by addition of sodium chloride, filtered by suction and dried. It constitutes a dark powder which is soluble in water with a brownish-red coloration and in concentrated sulfuric acid with an orange coloration. The new dyestuff dyes cotton and cellulosic fibres in brownish-red shades which are changed into red shades of very good fastness properties, when subjected to an after-treatment with copper salts.

The thiourea of 1-(4' - aminophenyl) - 3-methyl-5-pyrazolone can be made by treating 37.8 parts of 1-(4'-aminophenyl)-3-methyl-5-pyrazolone in 500 parts of water with thiophosgene in the presence of an excess of sodium carbonate, until no more free amino groups can be detected, or by condensing 1 - 4' - aminophenyl)-3-methyl-5-pyrazolone with carbon disulfide in the presence of small quantities of hydrogen peroxide, until no more free amino groups can be detected.

Instead of the diazo compound from 9.3 parts of 1-aminobenzene, there may be used the diazo compounds from 18.2 parts of 5-nitro-2-aminobenzoic acid, 13.7 parts of 5-methyl-2-methoxy-1-aminobenzene, 14.3 parts of 2-aminonaphthalene, 22.6 parts of 4-amino-4'-acetylaminodiphenyl, 13.35 parts of 5-chloro-2-hydroxy-1-aminobenzene or 30.8 parts of 6-benzoylamino-2-amino-1-hydroxybenzene-4-sulfonic acid, the procedure being essentially the same as described in the above example.

Example 7

29.5 parts of 1 - diazo - 6 - nitro - 2 - hydroxynaphthalene-4-sulfonic acid are combined according to Example 1 with 40.4 parts of urea of 1-(4' - aminophenyl) - 3-methyl-5-pyrazolone, thus giving the monoazo dyestuff, which is then further coupled in a litmus-neutral medium to the disazo dyestuff by means of the diazonium compound from 22.6 parts of 4-amino-4'-acetylaminodiphenyl. The so-obtained dyestuff is isolated by addition of sodium chloride, then filtered by suction and dried and represents a dark powder, which is soluble in water with an orange-red coloration and in concentrated sulfuric acid with an orange coloration. The new dyestuff dyes cellulosic fibres in brownish-red shades which become orangeish-red on after-treatment with copper-sulfate, the fastness properties in the moist state and to light becoming thus substantially improved.

A dyestuff having similar properties will be obtained, when diazotizing, as described in the above example, 29.5 parts of 3:3'-dichloro-4-amino-4'-acetylaminodiphenyl, instead of 4-amino-4'-acetylaminodiphenyl, the procedure being essentially the same as described in the above example.

Example 8

29.5 parts of 1-diazo-6-nitro-2-hydroxynaphthalene-4-sulfonic acid are combined with 43.2 parts of urea of 1-(4'-amino-2'-methylphenyl)-3-methyl-5-pyrazolone in the presence of an excess of sodium carbonate, while cooling with ice, thus giving the intermediate product, which is completed after some hours. The excess of sodium carbonate is removed by means of hydrochloric acid, until a bicarbonatic reaction has been reached, whereupon the intermediate product is further coupled with the diazonium compound of 13.35 parts of 5-chloro-2-hydroxy-1-aminobenzene. The disazo dyestuff thus formed is precipitated by addition of sodium chloride, filtered and dried. It is a dark powder which is soluble in water with a brown-red coloration and in concentrated sulfuric acid with an orange coloration and dyes cellulosic fibres from a neutral dye bath containing Glauber's salt in reddish-brown shades which become red by an after-treatment with copper sulfate, the resulting red shades being distinguished by very good fastness properties to light and in the moist state.

The urea of 1-(4'-amino-2'-methylphenyl)-3-methyl-5-pyrazolone is produced by introduction of phosgene into a solution containing 40.6 parts of the above said aminopyrazolone in 500 parts of water in the presence of an excess of sodium carbonate, this procedure being carried out at room temperature until no more free amino groups are present.

1 - (4'-amino - 2 - methylphenyl) -3-methyl-5-pyrazolone is obtained from 13 parts of acetoacetic acid ethyl ester by interaction with 16.7 parts of 4-nitro-2-methylphenylhydrazine in boiling alcohol, whereby first the corresponding 1 - (4' - nitro-2-methylphenyl)-3-methyl-5-pyrazolone is produced which by reduction with iron is converted into the above said amino pyrazolone.

When causing other acyl acetic esters or substituted p-nitrophenylhydrazines to react with each other in equivalent quantities, the corresponding 1 - (4'-nitrophenyl)-5-pyrazolones or 1-(4' - aminophenyl)-5-pyrazolones respectively will be produced, which products have similar properties as the above described 1-(4'-amino-2' methylphenyl)-3-methyl-5-pyrazolone.

The following table sets forth additional examples of dyestuffs according to the present invention, the process of preparation being essentially analogous to the process described in the preceding examples.

Table

| No. | diazo compound | dipyrazolone according to Formula II | A-aromatic amine | shade of the coppered dyeing on cellulosic fibres |
|---|---|---|---|---|
|  |  | urea from— |  |  |
| 1 | 1-diazo-6-nitro-2-hydroxynaphthalene-4-sulfonic acid. | 1-(4'-aminophenyl)-3-methyl-5-pyrazolone. | 5-nitro-2-amino-benzoic acid | orange. |
| 2 | do | 1-(4'-aminophenyl)-3-phenyl-5-pyrazolone. | 2-chloro-1-aminobenzene | red. |
| 3 | do | 1-(4'-aminophenyl)-3-methyl-5-pyrazolone. | 4-chloro-1-aminobenzene | Do. |

| No. | diazo compound | dipyrazolone according to Formula II | A-aromatic amine | shade of the coppered dyeing on cellulosic fibres |
|---|---|---|---|---|
| | | *urea from—* | | |
| 4 | 1-diazo-6-nitro-2-hydroxynaphthalene-4-sulfonic acid. | 1-(4'-aminophenyl)-3-ethyl-5-pyrazolone. | 2:5-dimethoxy-1-aminobenzene | red. |
| 5 | do | 1-(4'-amino-3'-methyl-phenyl)-3-methyl-5-pyrazolone. | 1-aminonaphthalene-4-sulfonic acid | orange-red. |
| 6 | do | 1-(4'-aminophenyl)-3-methyl-5-pyrazolone. | 1-amino-4'-nitro-stilbene-2:2'-disulfonic acid. | orange. |
| 7 | do | 1-(4'-aminophenyl)-3-methyl-5-pyrazolone. | 2-methoxy-1-aminobenzene-5-sulfonic acid. | orange-red. |
| 8 | do | 1-phenyl-(4'-phenyl-3':2''-dichloro-4''-amino)-3-methyl-5-pyrazolone. | 6-nitro-2-amino-1-hydroxybenzene-4-sulfonic acid. | Do. |
| 9 | do | 1-(4'-aminophenyl)-3-methyl-5-pyrazolone. | 6-benzoyl-amino-2-amino-1-hydroxybenzene-4-sulfonic acid. | red. |
| 10 | do | do | 4-benzoyl-amino-2-amino-1-hydroxybenzene-6-sulfonic acid. | Do. |
| 11 | do | do | 4-aminodiphenyl-ether | red-orange. |
| 12 | do | do | 4-nitro-1-aminobenzene | red. |
| 13 | do | 1-(4'-amino-2'-chlorophenyl)-3-methyl-5-pyrazolone. | 4-hydroxy-3-carboxy-1-aminobenzene | orange-red. |
| 14 | do | 1-(4'-aminophenyl)-3-methyl-5-pyrazolone. | 5-acetylamino-2-amino-benzoic acid | orange. |
| | | *thiourea from—* | | |
| 15 | do | 1-(4'-aminophenyl)-3-methyl-5-pyrazolone. | 4-methyl-1-amino-benzene | red. |
| | | *urea from—* | | |
| 16 | do | 1-(4'-aminophenyl)-3-methyl-5-pyrazolone. | 2-hydroxy-5-chloro-1-aminobenzene | Do. |
| 17 | do | do | 2:5-dimethoxy-4-nitro-1-aminobenzene | Do. |
| 18 | do | 1-(4'-amino-2'-methoxyphenyl)-3-methyl-5-pyrazolone. | 1-aminobenzene-4-sulfonamide | Do. |
| 19 | do | 1-(4'-aminophenyl)-3-methyl-5-pyrazolone. | 5-carboxy-2-aminobenzoic acid | orange. |
| 20 | do | do | 1-amino-4-dimethyl-aminobenzene | red. |
| 21 | do | do | 1-amino-4-acetyl-aminobenzene | Do. |
| 22 | do | do | 1-amino-4'-acetyl-aminostilbene-2:2'-disulfonic acid. | orange-red. |

What I claim is:

1. Process for the manufacture of a metallizable disazo dyestuff which, in the free state, corresponds to the formula

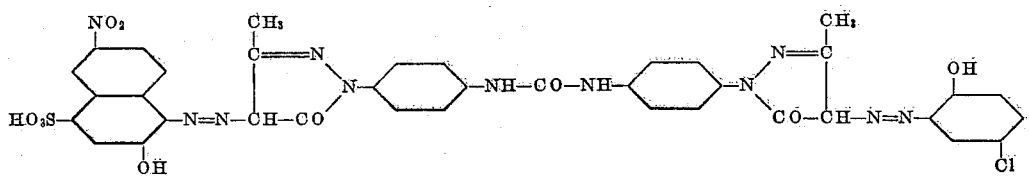

which comprises coupling 1 mole of 1-diazo-6-nitro-2-hydroxy-naphthalene-4-sulfonic acid with 1 mole of the pyrazolone-urea of the formula

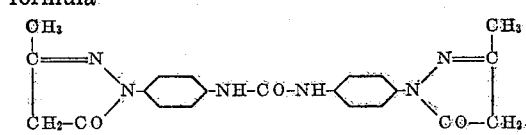

and coupling the so obtained monoazo dyestuff with 1 mole of diazotized 4-chloro-2-aminophenol.

2. Process for the manufacture of a metallizable disazo dyestuff which, in the free state, corresponds to the formula

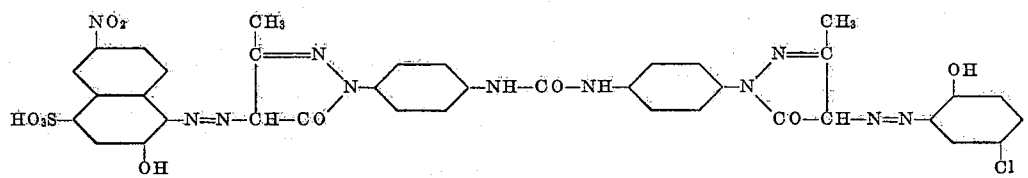

which comprises coupling 1 mole of 1-diazo-6-nitro-2-hydroxy-naphthalene-4-sulfonic acid with 1 mole of the pyrazolone-urea of the formula

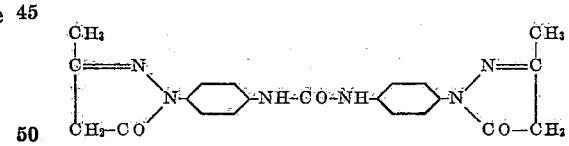

and coupling the so obtained monoazo dyestuff with 1 mole of diazotized 5-methyl-2-methoxy-1-aminobenzene.

3. The metallizable disazo dyestuff which, in the free state, corresponds to the formula

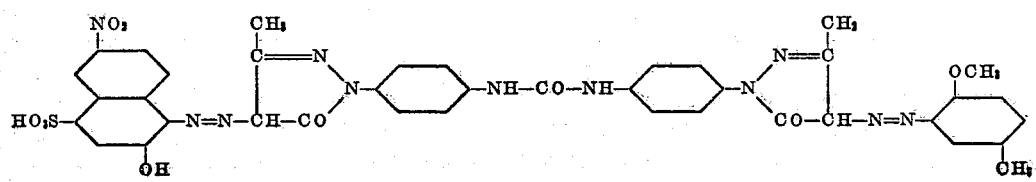

4. The metallizable disazo dyestuff which, in the free state, corresponds to the formula

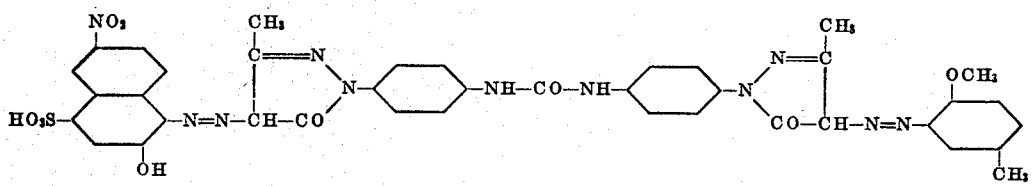

5. A metallizable disazo dyestuff which, in the free state, corresponds to the formula

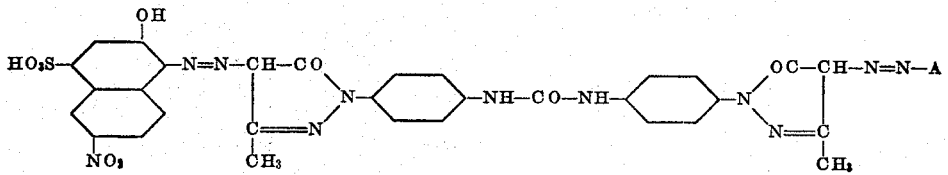

wherein A stands for a radical of the benzene series free from sulfonic acid groups.

6. A process for the manufacture of a metallizable disazo dyestuff which, in the free state, corresponds to the formula

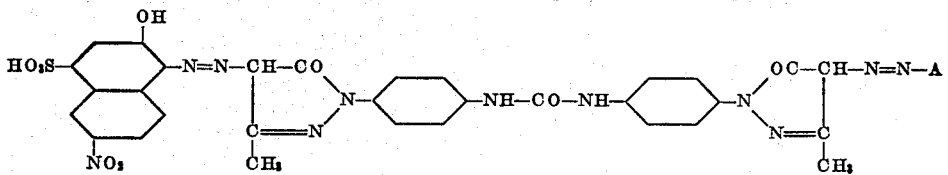

wherein A stands for a radical of the benzene series free from sulfonic acid groups, which comprises coupling 1 mole of 1-diazo-6-nitro-2-hydroxy-naphthalene-4-sulfonic acid with 1 mole of the pyrazolone-urea of the formula

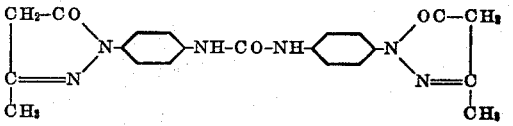

and coupling the so-obtained monoazo dyestuff with 1 mole of a diazotized amine of the benzene series free from sulfonic acid groups.

PETER HINDERMANN.

REFERENCES CITED

The following references are of record in the file of this patent:

UNITED STATES PATENTS

| Number | Name | Date |
|---|---|---|
| 1,845,426 | Latten | Feb. 16, 1932 |
| 2,185,901 | Schmid | Jan. 2, 1940 |
| 2,195,784 | Schmid | Apr. 2, 1940 |
| 2,195,787 | Schmid | Apr. 2, 1940 |
| 2,195,788 | Schmid | Apr. 2, 1940 |
| 2,221,360 | Schmid | Nov. 12, 1940 |
| 2,221,361 | Schmid | Nov. 12, 1940 |
| 2,228,374 | Stusser | Jan. 14, 1941 |